(12) United States Patent
Copeland et al.

(10) Patent No.: US 8,300,615 B2
(45) Date of Patent: Oct. 30, 2012

(54) SYNCHRONIZATION OF TIME IN A MOBILE AD-HOC NETWORK

(75) Inventors: Gregory Clark Copeland, Plano, TX (US); Scott Y. Seidel, Fairfax, VA (US)

(73) Assignee: Powerwave Cognition, Inc., Santa Ana, CA (US)

( * ) Notice: Subject to any disclaimer, the term of this patent is extended or adjusted under 35 U.S.C. 154(b) by 0 days.

(21) Appl. No.: 13/165,033

(22) Filed: Jun. 21, 2011

(65) Prior Publication Data

US 2012/0127977 A1 May 24, 2012

Related U.S. Application Data

(63) Continuation-in-part of application No. 12/418,363, filed on Apr. 3, 2009, now Pat. No. 8,060,017.

(60) Provisional application No. 61/042,431, filed on Apr. 4, 2008, provisional application No. 61/042,442, filed on Apr. 4, 2008, provisional application No. 61/074,930, filed on Jun. 23, 2008, provisional application No. 61/082,618, filed on Jul. 22, 2008, provisional application No. 61/082,642, filed on Jul. 22, 2008, provisional application No. 61/086,242, filed on Aug. 5, 2008, provisional application No. 61/084,738, filed on Jul. 30, 2008, provisional application No. 61/084,773, filed on Jul. 30, 2008, provisional application No. 61/094,394, filed on Sep. 4, 2008, provisional application No. 61/094,546, filed on Sep. 5, 2008, provisional application No. 61/118,232, filed on Nov. 26, 2008, provisional application No. 61/094,584, filed on Sep. 5, 2008, (Continued)

(51) Int. Cl.
*H04W 4/00* (2009.01)
*H04J 3/00* (2006.01)
*G06F 15/16* (2006.01)
(52) U.S. Cl. .................. 370/338; 370/345; 709/205
(58) Field of Classification Search ............... 455/41.2; 370/338, 345, 310, 347, 400, 328, 329; 709/205; 725/68, 110, 119
See application file for complete search history.

(56) References Cited

U.S. PATENT DOCUMENTS
6,487,500 B2  11/2002 Lemelson et al.
(Continued)

FOREIGN PATENT DOCUMENTS
WO  WO-2007031958 A2  3/2007
(Continued)

OTHER PUBLICATIONS

"U.S. Appl. No. 12/418,363, Notice of Allowance mailed Sep. 28, 2011", 8.
(Continued)

*Primary Examiner* — Stephen Jones
(74) *Attorney, Agent, or Firm* — Strategic Patents, P.C.

(57) ABSTRACT

Methods and systems are disclosed herein for synchronizing network time in a mobile ad-hoc network (MANET). Each node in the MANET may be synchronized with all of its neighbors for effective communications. More specifically, a local timing reference may be adjusted according to measured errors in incoming control packets so that time slotted transmissions can be scheduled without collisions with other nodes. The method and system is a low overhead protocol that only requires a small amount of data attached to each scheduled transmission avoiding the requirement for separate messaging. This may reduce the overhead of maintaining the MANET providing additional efficiency and robustness.

20 Claims, 14 Drawing Sheets

Related U.S. Application Data provisional application No. 61/094,591, filed on Sep. 5, 2008, provisional application No. 61/094,594, filed on Sep. 5, 2008, provisional application No. 61/094,611, filed on Sep. 5, 2008, provisional application No. 61/095,298, filed on Sep. 8, 2008, provisional application No. 61/095,310, filed on Sep. 9, 2008, provisional application No. 61/094,183, filed on Sep. 4, 2008, provisional application No. 61/094,203, filed on Sep. 4, 2008, provisional application No. 61/094,279, filed on Sep. 4, 2008, provisional application No. 61/094,294, filed on Sep. 4, 2008, provisional application No. 61/094,231, filed on Sep. 4, 2008, provisional application No. 61/094,247, filed on Sep. 4, 2008, provisional application No. 61/094,310, filed on Sep. 4, 2008, provisional application No. 61/103,106, filed on Oct. 6, 2008, provisional application No. 61/111,384, filed on Nov. 5, 2008, provisional application No. 61/112,131, filed on Nov. 6, 2008, provisional application No. 61/121,169, filed on Dec. 9, 2008.

(56) References Cited

U.S. PATENT DOCUMENTS

| | | |
|---|---|---|
| 6,889,372 B1 | 5/2005 | Teig et al. |
| 6,977,938 B2 | 12/2005 | Alriksson et al. |
| 7,333,026 B2 | 2/2008 | Hunzinger |
| 7,367,039 B2 | 4/2008 | Allen |
| 8,060,017 B2 | 11/2011 | Schlicht et al. |
| 2001/0000959 A1 | 5/2001 | Campana |
| 2003/0036374 A1 | 2/2003 | English et al. |
| 2004/0146007 A1 | 7/2004 | Saadawi et al. |
| 2004/0203820 A1 | 10/2004 | Billhartz et al. |
| 2005/0186933 A1 | 8/2005 | Trans |
| 2006/0083205 A1 | 4/2006 | Buddhikot et al. |
| 2006/0280201 A1 | 12/2006 | Hammel et al. |
| 2007/0087756 A1 | 4/2007 | Hoffberg |
| 2007/0248061 A1 | 10/2007 | Poston et al. |
| 2008/0049776 A1 | 2/2008 | Wiley et al. |
| 2008/0089298 A1 | 4/2008 | Anschutz |
| 2009/0252102 A1 | 10/2009 | Seidel et al. |
| 2009/0252134 A1 | 10/2009 | Schlicht et al. |
| 2010/0150027 A1 | 6/2010 | Atwal et al. |
| 2010/0169937 A1 | 7/2010 | Atwal et al. |
| 2011/0110273 A1 | 5/2011 | Copeland |

FOREIGN PATENT DOCUMENTS

| | | |
|---|---|---|
| WO | WO-2009/108858 A2 | 9/2009 |
| WO | WO-2009/108858 A3 | 12/2009 |
| WO | WO-2009/146132 A2 | 12/2009 |
| WO | WO-2009/146132 A3 | 12/2009 |
| WO | WO-2010/028307 A1 | 3/2010 |
| WO | WO-2010/028311 A1 | 3/2010 |
| WO | WO-2010/028315 A1 | 3/2010 |

OTHER PUBLICATIONS

Akyildiz, I. F., "NeXt generation/dynamic spectrum access/cognitive radio wireless networks", Computer Networks vol. 50, No. 13, pp. 2127-2159, May 17, 2006, 2127-2159.

"U.S. Appl. No. 12/418,363, Non-Final Office Action mailed Jun. 30, 2010",, 7.

"International Application Serial No. PCT/US2009/056130, Search Report and Written Opinion mailed Dec. 22, 2009", PCT/US2009/056130, 20 pgs.

"Int'l Appl Serial No. PCT/US2009/039479, ISR & WO mailed Nov. 20, 2009", PCT/US09/039479, 11.

"Int'l Appl Serial No. PCT/US2009/056126, ISR & WO mailed Oct. 29, 2009", PCT/US09/056126.

"Int'l Appl Serial No. PCT/US2009/056134, ISR & WO mailed Oct. 29, 2009", PCT/US09/056134.

"Int'l Appl. Serial No. PCT/US09/35465, ISR & WO mailed Oct. 12, 2009", PCT/US09/35465, 12.

| | |
|---|---|
| ROUTING 1202 | IPv4 / RFC 791 |
| | BGP4 / RFC 4271 |
| | SCOPED LINK STATE ROUTING |
| | RECEIVE-ORIENTED MULTICAST |
| MAC 1204 | ENCAPSULATION / RFC 894 / RFC 1042 |
| | MAC 802.3 |
| | NEIGHBORHOOD DISCOVERY MANAGEMENT |
| | ADAPTIVE DATA RATE |
| | QUEUE SERVING |
| | ARP / RFC 826 |
| | DHCP |
| | NAMA CHANNEL ACCESS |
| | SEGMENTATION AND REASSEMBLY |
| PHYSICAL 1206 | LANTA - NETWORK TIMING |
| | CONFIGURABLE WAVEFORM |
| | WAVEFORM MODES |
| | TDMA/FDMA |

SYNCHRONIZATION OF TIME IN A MOBILE AD-HOC NETWORK

RELATED APPLICATIONS

This application is a continuation-in-part of U.S. application Ser. No. 12/418,363 filed Apr. 3, 2009, which application claims the benefit of the following U.S. Provisional Patent applications: U.S. Provisional App. No. 61/042,431 filed Apr. 4, 2008; U.S. Provisional App. No. 61/042,442 filed Apr. 4, 2008; U.S. Provisional App. No. 61/074,930 filed Jun. 23, 2008; U.S. Provisional App. No. 61/082,618 filed Jul. 22, 2008; U.S. Provisional App. No. 61/082,642 filed Jul. 22, 2008; U.S. Provisional App. No. 61/086,242 filed Aug. 5, 2008; U.S. Provisional App. No. 61/084,738 filed Jul. 30, 2008; U.S. Provisional App. No. 61/084,773 filed Jul. 30, 2008; U.S. Provisional App. No. 61/094,394 filed Sep. 4, 2008; U.S. Provisional App. No. 61/094,546 filed Sep. 5, 2008; U.S. Provisional App. No. 61/118,232 filed Nov. 25, 2008; U.S. Provisional App. No. 61/094,584 filed Sep. 5, 2008; U.S. Provisional App. No. 61/094,591 filed Sep. 5, 2008; U.S. Provisional App. No. 61/094,594 filed Sep. 5, 2008; U.S. Provisional App. No. 61/094,611 filed Sep. 5, 2008; U.S. Provisional App. No. 61/095,298 filed Sep. 8, 2008; U.S. Provisional App. No. 61/095,310 filed Sep. 9, 2008; U.S. Provisional App. No. 61/094,183 filed Sep. 4, 2008; U.S. Provisional App. No. 61/094,203 filed Sep. 4, 2008; U.S. Provisional App. No. 61/094,279 filed Sep. 4, 2008; U.S. Provisional App. No. 61/094,294 filed Sep. 4, 2008; U.S. Provisional App. No. 61/094,231 filed Sep. 4, 2008; U.S. Provisional App. No. 61/094,247 filed Sep. 4, 2008; U.S. Provisional App. No. 61/094,310 filed Sep. 4, 2008; U.S. Provisional App. No. 61/103,106 filed Oct. 6, 2008; U.S. Provisional App. No. 61/111,384 filed Nov. 5, 2008; U.S. Provisional App. No. 61/112,131 filed Nov. 6, 2008; and U.S. Provisional App. No. 61/121,169 filed Dec. 9, 2008.

Each of the foregoing applications is hereby incorporated by reference in its entirety.

BACKGROUND

1. Field

The invention herein disclosed generally refers to mobile ad-hoc networks, and specifically to synchronization of time in a mobile ad-hoc network.

2. Description of the Related Art

A mobile ad-hoc network (MANET) is a wireless ad-hoc network that supports a dynamic topology. Any mobile node in a MANET may communicate with any other node, either directly or through multiple hops across the network topology. Clock synchronization in a MANET is important for providing optimum efficiency and network throughput. Additionally, synchronization may result in significant power savings.

Current protocols may provide network time to the nodes in a MANET. A commonly used protocol is NTP (network timing protocol) originally used to maintain clocks for computers attached to the Internet. In the context of a MANET where nodes operate autonomously and might not receive explicit synchronization or other timing information, other timing protocols have been developed. The most commonly used protocol is the Reference Broadcast Synchronization (RBS) protocol. This protocol requires many transmissions and time stamps exchanged between nodes to establish a local time reference. However, this is costly in terms of spectrum usage and processor needs.

Other protocols for enabling synchronization in MANETs are Lightweight Time Synchronization (LTS), Timing-sync Protocol for Sensor Networks (TPSN), Hierarchy Referencing Time Synchronization (HRTS) and the like. These protocols utilize dedicated network traffic and communication between the nodes, which can reduce network efficiency.

In existing protocols, a receiving node in a network resolves time and frequency offsets on each packet prior to demodulation. This includes resolving frequency offsets between the receiver and the received waveform due to oscillator error, Doppler Effect, and the like. The time and frequency offset resolution includes calculating frequency error after ensuring successful time acquisition. This information is passed to the timing protocol.

Another commonly used protocol uses an approach that includes broadcasting timing information by access points (APs) in the network to other nodes in the network. However, this process results in a timing error that is accumulated at each hop while communicating the timing information due to transit delays.

There remains a need for a method and system that synchronizes time between the nodes in a MANET without dedicated communications among MANET nodes. Additionally, there remains a need for synchronization techniques that reduce loading on network capacity.

SUMMARY

Methods and systems are disclosed herein for synchronizing network time in a mobile ad-hoc network (MANET). Each node in the MANET may be synchronized with all of its neighbors for effective communications. More specifically, a local timing reference may be adjusted according to measured errors in incoming control packets so that time slotted transmissions can be scheduled without collisions with other nodes. The method and system is a low overhead protocol that only requires a small amount of data attached to each scheduled transmission avoiding the requirement for separate messaging. This may reduce the overhead of maintaining the MANET providing additional efficiency and robustness.

BRIEF DESCRIPTION OF THE FIGURES

The invention and the following detailed description of certain embodiments thereof may be understood by reference to the following figures:

FIG. 12 shows a MANET Wireless Protocol that may be used by devices within a MANET.

DETAILED DESCRIPTION

Figure 1:
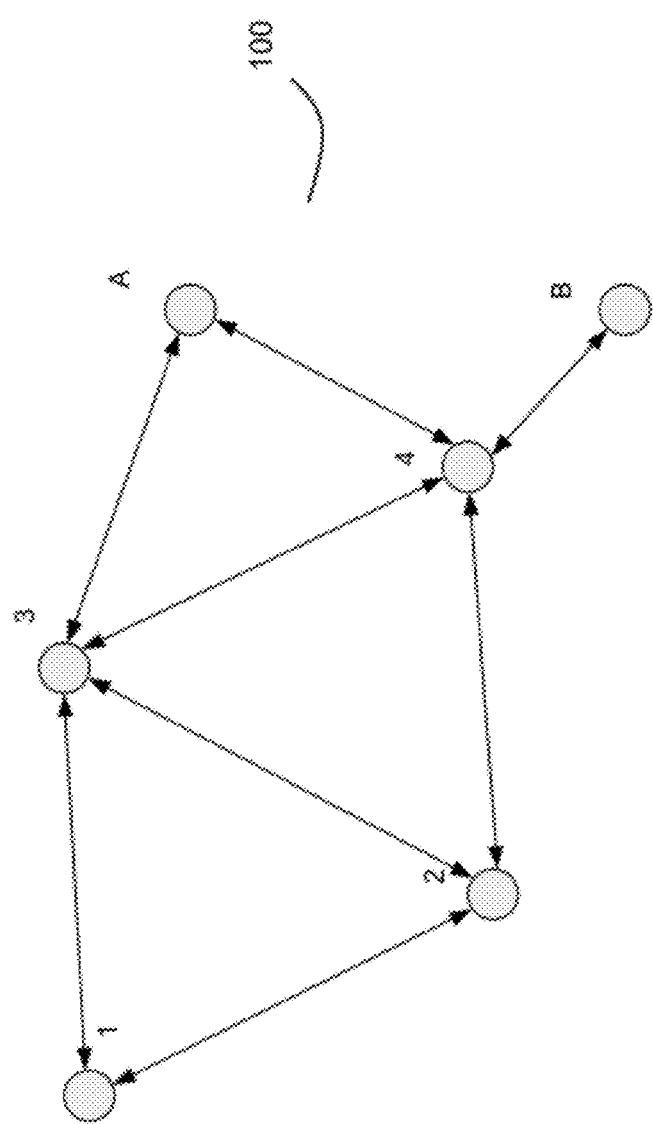
FIG. 1 depicts a method for time synchronization in a mobile ad-hoc wireless network in accordance with an embodiment of the present invention.

While the specification concludes with the claims defining the features of the invention that are regarded as novel, it is believed that the invention will be better understood from a consideration of the following description in conjunction with the drawings figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defied as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

Referring to FIG. 1, a mobile ad-hoc wireless network is shown where embodiments of the present invention may be implemented for providing time synchronization. FIG. 1 is a representative MANET network where nodes 1-4 are user nodes and the nodes A, B are access point (AP's). The AP's may have knowledge of network timing to insignificant levels compared to the timing needs. A method for enabling timing synchronization may include communicating a sense of network timing at all the nodes with sufficient accuracy to enable reliable communications. The network timing may include slot timing and carrier frequency timing. In an aspect of the present invention, it may be assumed that each node may be designed so that the slot timing and the carrier frequency is derived from the same local reference. In an example, frequency error in the slot timing may be directly proportional to the carrier frequency error. The carrier frequency may be an integer multiple of slot rate. In an example, the slot rate may be 1 KHz.

In general, each node may have a local time base used to schedule slotted transmissions in a time-based communications protocol such as a Time-Division Multiple Access ("TDMA") protocol. The nodes 3 and 4 in the network 100 may use the access points 'A' and 'B' for obtaining timing information for synchronization, e.g., an initial time base for TDMA communications. The nodes 1 and 2 may use an indirect approach by obtaining the timing information derived from the nodes 3 and 4 for synchronization. As described in greater detail below, the nodes may cooperate to adjust for various sources of error so that a substantially consistent time base is used by each of the nodes. A node may also be referred to herein as a "terminal", although the name given to a node in a wireless ad hoc network may vary according to the protocol or radio technology. Thus for example, a node may be referred to as a terminal, a subscriber device, an eNB (E-UTRAN Node B, from 3GPP Long Term Evolution ("LTE")), or any other like term. All such participants in an ad hoc network are intended to fall within the scope of this disclosure unless a more specific meaning is explicitly provided or otherwise clear from the context.

In an embodiment, the timing information may be obtained by comparing the incoming packet timing to the local timing reference. In this embodiment, the relative timing of all of the neighbor nodes may be tracked and the local node timing may be set to match the mean of these tracked times. This local node timing (as adjusted) may serve as a local time base for a node. The tracking may be accomplished using, e.g., a Kalman filter with two states. In an example, the two states may be the time offset of the slot and the incoming carrier frequency (the number of states may be increased and the delay as an additional state may be introduced later). This method may be used by each node to synchronize to a network time and estimate the error in a local timing reference relative to the network time.

In embodiments, all the nodes in the network may have identical radio hardware, that is, each node may employ a similarly configured and controlled radio to share a common air interface. The transmissions by a node may start at the beginning of a slot time relative to the local timing reference. Reception of a packet by a node may be detected by the receiver hardware and the time and frequency offset may be measured by the hardware relative to the local time base.

In embodiments, the hardware in a node may have control registers to apply time and frequency offsets to the local time base so that later transmissions and receptions are made to this corrected time base. The transmission time may be advanced with additional hardware to remove the mean path delay if desired. Slot counts may be obtained elsewhere in the MAC header or other mechanism so that only the time offset relative to the slot start needs to be tracked.

Network timing may initially be acquired by a node on power-up. The node may detect rogue nodes (out of frequency spec) of both neighbors and the local timing error. The node may estimate the link delays so that these delays may be removed from the timing reference.

In embodiments, every terminal (whether mobile or AP) may be in one of three time/frequency states at every moment in time. In a first state, an "OFF-NET" state, the terminal has not yet entered into the network. In this state, the terminal needs to acquire Time-Division Multiple Access ("TDMA") time and frequency error from a control packet received over the network. In a second state, an "IN-NET" state, the terminal is guaranteed to have time and frequency errors to within a predetermined error specification. In a third state, an "OUT-OF-NET" state, the terminal may have control packet information, but cannot guarantee that time and frequency errors are within the predetermined error specification for the network. This may occur, for example, due to possible frequency drift or a reference oscillator or TDMA clock drift, and/or when too much time has passed since a most recent control packet with time/frequency information.

Terminals may be IN-NET to fully participate in the network. OUT-OF-NET terminals may spend all their time attempting to transition to IN-NET by a time/frequency recovery protocol. OFF-NET terminals wanting to enter the network may spend all their time attempting to transition to IN-NET by a time/frequency recovery protocol. The time/frequency recovery protocol may be different for OUT-OF-NET and OFF-NET terminals, or the protocol may be the same. IN-NET terminals continually improve their time/frequency estimates by a time/frequency maintenance protocol In the time/frequency maintenance protocol, a node may track the relative time difference between the local clock and the received packets from all other nodes in the neighborhood. It may be assumed that the data was properly aligned in the source node slot relative to its corresponding local timebase (with any corrections). The path delays may also be significant in maintaining communications over that link and may be estimated. As part of the same protocol the link loss may be incorporated. Additional smoothing may be done with a Kalman filter to minimize total system time error by tracking neighbors. From the link time error estimates the local error may be computed, along with a standard deviation for the local error. The link delays may be computed from the information provided by the remote transmitters. The local transmitter may be advanced by the mean link delay to reduce the uncertainty at the receivers. With relative time tracking the guard time can be drastically reduced down to less than 10 microseconds Additional precision may be obtained tracking neighbor frequency as well as phase noise. Mean neighbor frequency/phase in multicast and the target frequency/phase in directed communications (most critical in carrier frequency) may be used. Each node may use a weighted average of the neighborhood nodes frequency/time to establish its local frequency/time.

Figure 2:
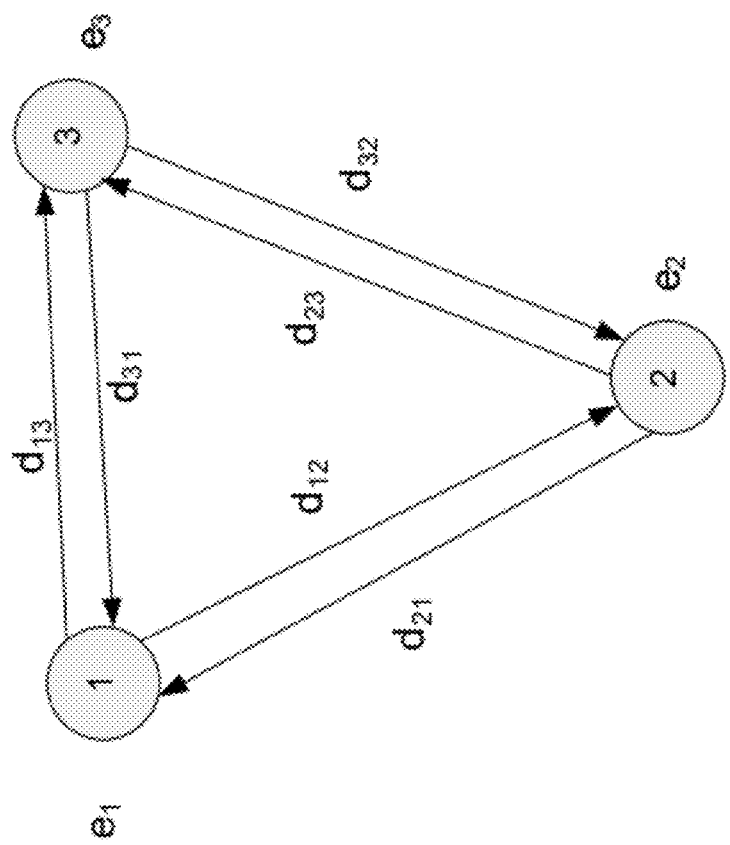
FIG. 2 illustrates an algorithm for estimating the relative time of each node, correcting for time offsets and estimating delay of each link in two mobile ad-hoc networks in accordance with an embodiment of the present invention.

FIG. 2 illustrates an example topology for evaluating the algorithm. Estimating the relative time of each node, correcting for time offsets and estimating delay of each link in two mobile ad-hoc networks in accordance with an embodiment of the present invention is discussed. FIG. 2 shows a simple three-node mobile ad-hoc network 202 that was used for evaluation of the techniques described herein. In general, the algorithm estimates the relative time of each node, corrects for time offsets and estimates the delays of each link in the network.

In an embodiment, in the network 202, each node has a time offset of $e_i$ and the time of reception is $(e_i - e_j) + d_{ij}$ for the reception of a packet from node i to node j and the link delay is $d_{ij}$ for this specific link. It is assumed that these delays are symmetric, that is, $d_{ij} = d_{ji}$. For the network 202 there are 6 unknowns for the absolute time offsets $e_i$ and the link delays $d_{ij}$ where $\{i,j \ni [0,N-1]\}$ and N is the number of nodes. The network 202 has 6 observables, namely the arrival times on the 3 links in each direction. These parameters may be used to develop a Kalman filter for evaluating mean time offsets as described for example in U.S. Prov. App. No. 61/042,431, incorporated herein by reference in its entirety. The details of this particular approach are not repeated here, and it will be readily appreciated that numerous techniques may be usefully employed to determine aggregate statistics or other quantitative characteristics of path delays and time offsets based on a number of received control packets.

Using the techniques described above all nodes should generally be able to acquire all neighbor time/frequency accurately for neighbor to neighbor communications. The propagation of a neighborhood time frequency so that multicast messages, contention message request, and generally slotted ALOHA across the mesh however may be an issue.

For larger meshes, there may be a time/frequency tilt across the mesh even though accurate synchronization is still desired for the shared air interface. Based on an empirical analysis, synchronization may be usefully maintained within about ten microseconds. If only the AP is allowed to transmit until sync has been acquired this does not appear to be an issue. However, a more generous approach to use of the air interface would permit nearly immediate communications between one hop neighbors in the event that the AP is distant so that the data can flow immediately.

Figure 3:
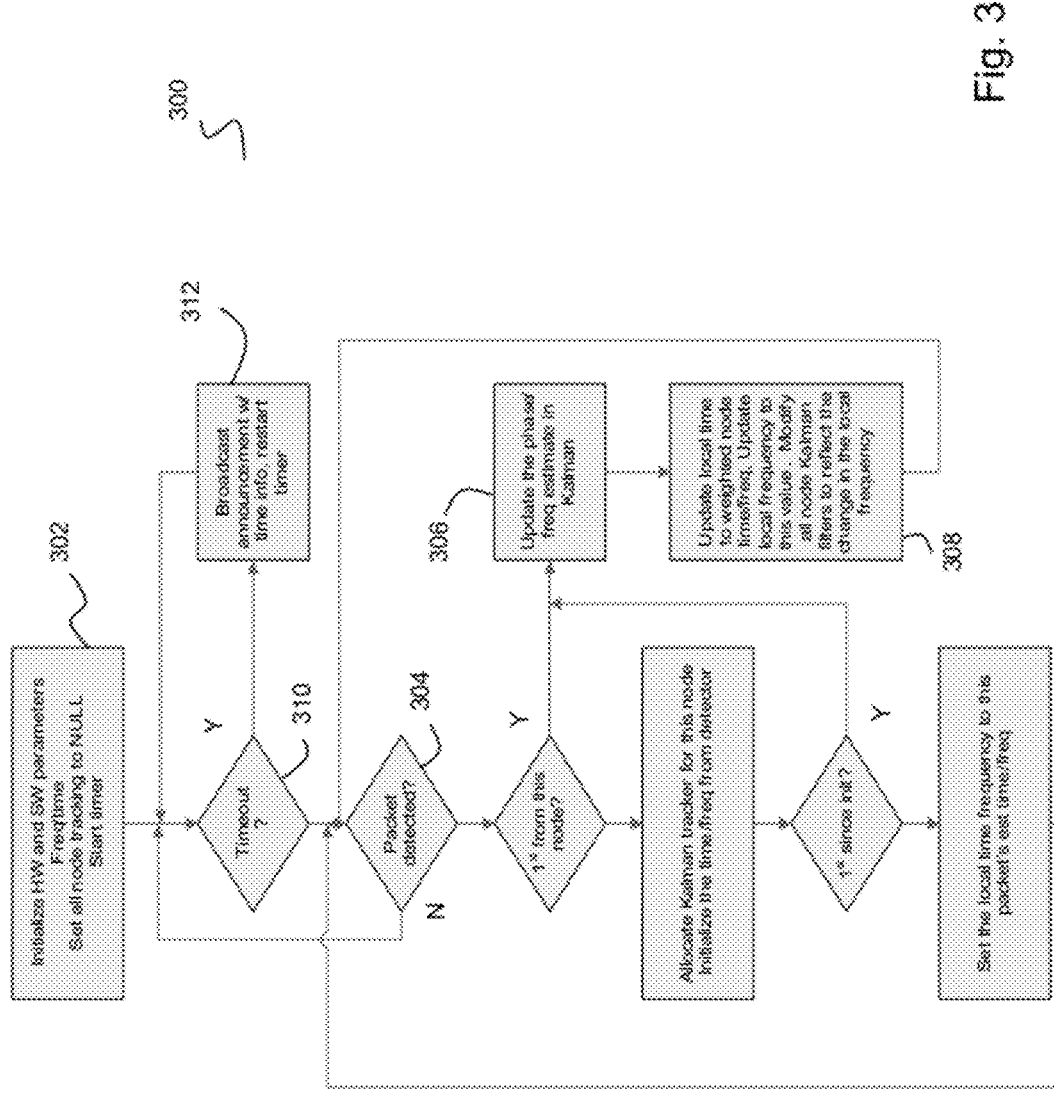
FIG. 3 depicts a method for using Kalman parameter estimates for obtaining time synchronization in a mobile ad-hoc network in accordance with an embodiment of the present invention.

FIG. 3 depicts a method for using Kalman parameter estimates for obtaining time synchronization in a mobile ad-hoc network in accordance with an embodiment of the present invention.

As shown in step 302, the process 300 may begin with initialization. In general, the Kalman parameter estimates may be applied to the local clocks to reduce the difference between MANET nodes. The reference point may be chosen as the reception time. If there is a local time offset as indicated by the Kalman filter, the local time offset may be set to drive this state to 0 (move the local time which in terms of the Kalman parameters changes the state by this amount). The transmissions may be advanced by the average of the delays of each of the links connected to the local node so that its transmissions arrive at a time at each of the receivers at a time of 0 as closely as possible without knowing the destination a-priori. This scheme may be modified to change the transmission time offset by an amount corresponding to the estimated delay on the link between the local transmitter and the destination node. The transmission delays may be expected to be small compared to the capture windows on the receivers, and may in some embodiments be ignored.

As shown in FIG. 3, on each reception of a packet (304) the hardware reports a time offset of the preamble relative to the local clock and a carrier offset estimate. Given these two measurements and the state of the transmitter node from the packet the local Kalman filter is executed to update the parameters estimates (306). The information received from the other node in the MAC header would be the time offsets and link delay estimates of its neighbors from their respective Kalman filters. Using a superposition approximation, the common elements (common neighbors) can be directly added to the Kalman filter state estimates.

As shown in step 308, the Kalman time offset may be subtracted from the local time correction offset. This time offset can then be subtracted from the Kalman time offset estimate effectively zeroing this value. If the frequency estimate is also used, the same applies to this variable as well.

Figure 4:
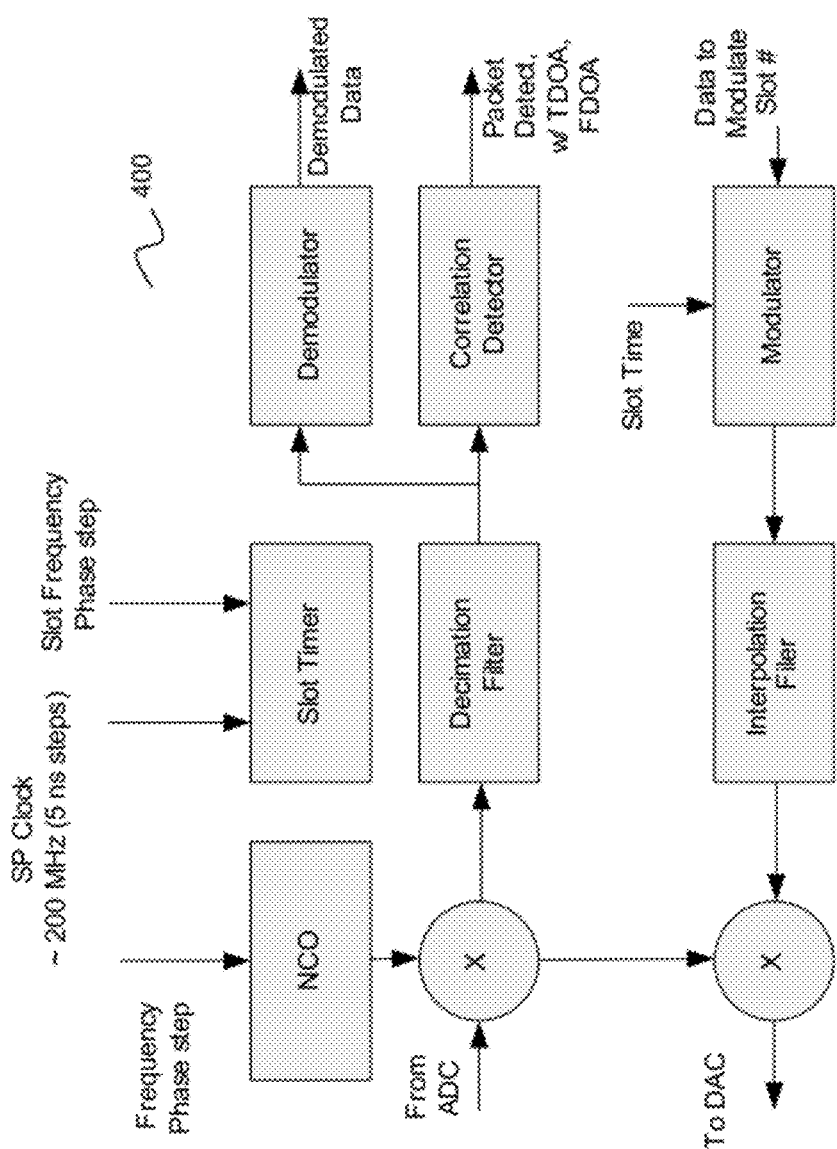
FIG. 4 illustrates the digital processing portion of the burst transceiver implemented in a node in a mobile ad-hoc network in accordance with an embodiment of the present invention.

FIG. 4 illustrates digital processing circuitry 400 for a burst transceiver implemented in a node in a mobile ad-hoc network in accordance with an embodiment of the present invention. The observables considered in the block diagram of FIG. 4 may be burst time of arrival relative to the slot timer and the carrier frequency. The controls available for timing purposes may be the slot and carrier phase and frequency (4 variables). It may be assumed that both the slot and carrier phase and frequency are derived from the same chip clock. From these observables, the frequency and phases are adjusted to the best possible system timing for both reception and transmission of data bursts.

Figure 5:
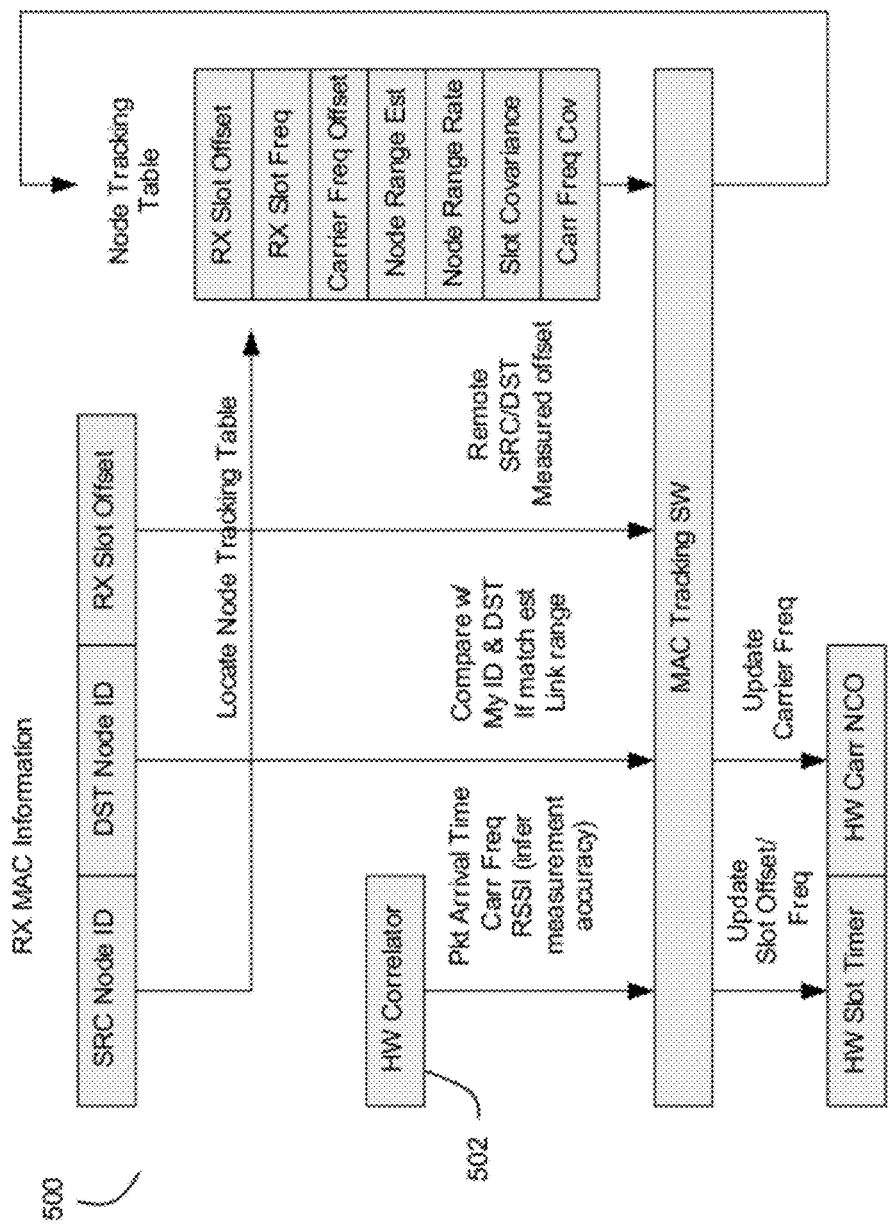
FIG. 5 depicts a top-level view of a timing subsystem in a mobile ad-hoc network in accordance with an embodiment of the present invention.

FIG. 5 illustrates a top-level view of a timing subsystem 500 in a mobile ad-hoc network in accordance with an embodiment of the present invention. In an embodiment, the system may use a slotted transmission method similar to a slotted ALOHA network. This approach may require accurate slot timing information to avoid collisions in the scheduling of the packets to be transmitted. The receiver must also associate these packets with the intended slots. Another timing requirement may be that the carriers may be set to common frequencies and tuned to avoid frequency offsets that would either introduce interference in adjacent channels or degrade the demodulation process. To set limits on the accuracy required, a maximum communications distance of about 5 Km is set. Therefore a transit time of about seventeen microseconds must be accounted for and must also be tracked to remove offsets so that all of the links are symmetric relative to this time difference. It may also be desirable to support slot sizes on the order of five hundred microseconds, which represents a tradeoff between the transit time and other overhead, the minimum packet size desired and the responsiveness and bandwidths available. Based on this information a target accuracy before transmission may be predetermined as 5-10 microseconds to reduce this uncertainty overhead. Another consideration is the timing accuracy needed to correctly demodulate an Orthogonal Frequency Division Multiplexing ("OFDM") symbol. If no correlator output is used to correct for time offsets, then the accuracy with 50 KHz carrier spacing would necessitate about 2 microsecond accuracy for a 1% inter-signal interference level. This may be deemed unreasonable and unnecessary for proper operation. For the timing tracking a correlator 502 may be required and an output from the correlator 502 may drive the demodulation process. In an example embodiment, the channel spacing may be set to 50 KHz. An acceptable amount of inter carrier interference (for the desired carrier tracking for demodulation) may be less than 5 KHz for a single OFDM symbol. In the power up phase of a modem (e.g., transceiver hardware for a node), a receiver may listen to the air interface and acquire initial slot and carrier frequency offsets from a received packet. The received packet has a slot ID tag that may be used to set the initial slot timer offset. The offset frequency may also be estimated and used as the initial carrier frequency. If no packet arrives within about 100 milliseconds (several frames, and small compared to human-perceptible time scales) a time out (step 310, FIG. 3) may occur and the node may instead announce its presence (step 312, FIG. 3). If another node is within listening distance the 2 or more nodes will acquire a mutual time base. When the powered up node receives a packet the node ID is also present in the packet so that this node can initialize a tracking loop associated with this remote node number. Each time a packet is received from this node the tracked state is updated with an improved time offset associated with this node. Periodically the listening node emits a packet and the destination nodes can compare the receive time compared to the estimated time to ascertain the link distance to this node (time in us) since this is a significant part of the link time budget.

Figure 6:
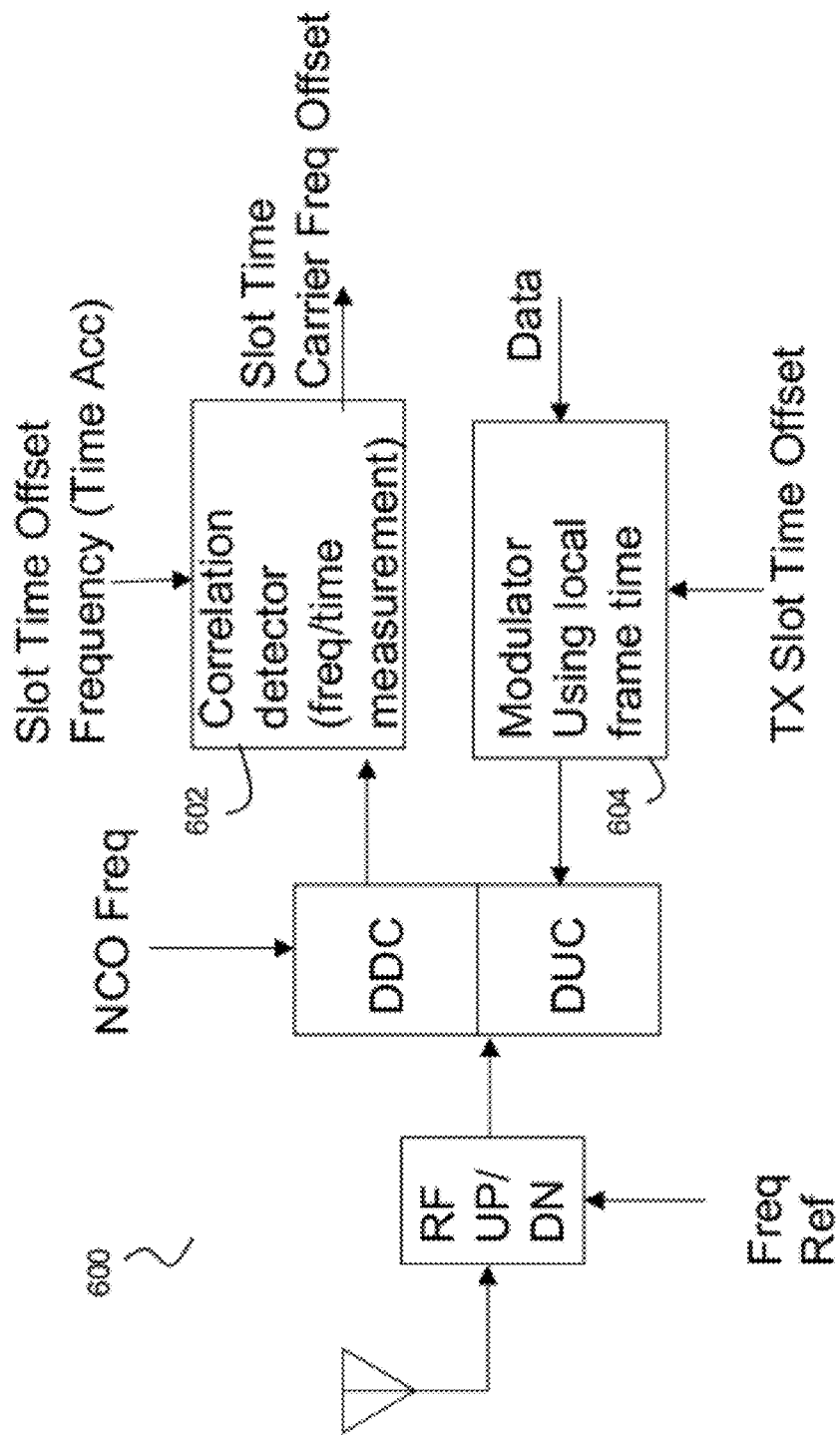
FIG. 6 illustrates hardware used for acquiring and adjusting slot time and frequency by a node in a mobile ad-hoc network in accordance with an embodiment of the present invention.

FIG. 6 illustrates circuitry 600 configured to acquire and adjust slot time and frequency by a node in a mobile ad-hoc network in accordance with an embodiment of the present invention. In general, a reference frequency ("Freq Ref") is used to modulate to ("RF UP") and from ("RF DN") the air interface. A numerically controlled oscillator ("NCO Freq") may then be employed in a codec to recover data (download, or "DDC") and encode data (upload, or "DUC") for transmission. Decoded data may be forwarded to a correlation detector 602 to recover a slot time and carrier frequency offset from the received packet based upon a previously determined slot time offset and frequency. Similarly data for transmission may be forwarded to a modulator 604 that uses a local time base, as adjusted according to the slot time offset as determined using the techniques described herein. During coarse (e.g., initial) acquisition the slot time may set to match the $1^{st}$ packet. Afterwards the slot time/frequency may be adjusted to track the weighted mean neighbor time. Carrier offset relative to local=Observables-receive time in slot+fractions. Phase Locked Loop (PLL) frequency offset=Control-preset local slot time offset (relative to current).

Figure 7:
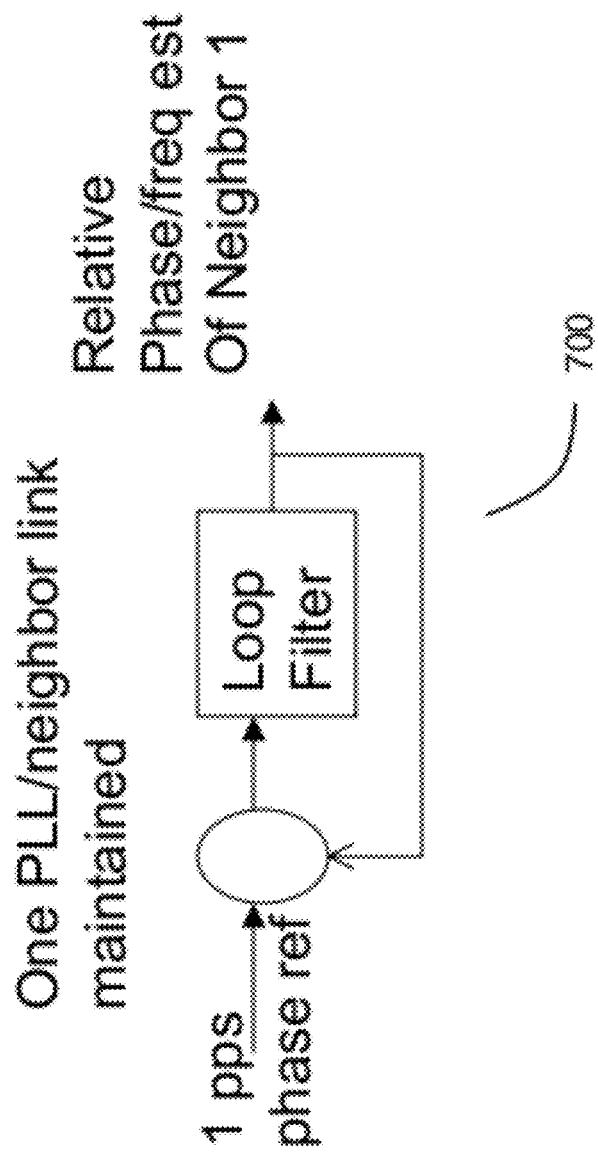
FIG. 7 depicts a functional block diagram of a Kalman filter used in a mobile ad-hoc network in accordance with an embodiment of the present invention.

FIG. 7 depicts a functional block diagram of a Kalman filter 700 used in a mobile ad-hoc network in accordance with an embodiment of the present invention. The figure shows the block diagram of a Kalman filter used in the form of a timing phase locked loop (PLL) to determine the local oscillator phase noise and receive phase/frequency detector characteristics. These characteristics may be used to tune the Kalman parameters and improve system performance.

To determine noise, a Simple Leeson phase noise model may be used for the reference oscillator. The model may assume phase noise of about 10 Hz/sec in frequency wander. Thus where a 10 MHz reference has about −140 dBc/Hz at 1 MHz, at 2.5 GHz this implies about −114 dBc/Hz at 1 MHz. In one second, a frequency drift may thus be about 2 mHz rms (after acquisition), although improvements may be obtained by cleaning a voltage controlled oscillator. The Leeson model under these conditions yields the equation:

$$L(d) = 10 * \log\left[\left(\frac{F}{(2*Q*d)^2} + 1\right) * \frac{NkT}{P} * \left(\frac{c}{d} + 1\right)\right] \quad [\text{Eq. 1}]$$

where d=frequency offset in Hz, L(d)=noise level at the frequency offset d in dBc/Hz, F=center frequency in Hz, Q=loaded Q, N=noise factor, k=Boltzmann's constant 1.380E-23 J/degree, T=Room temperature 290 degrees Kelvin, P=Power delivered to amplifier input in W, and c=Corner frequency for flicker (1/F) noise in Hz Traditional text book Kalman filters fail in practice when long term operation or ill conditioned data are encountered. Some implementations compute rescue variables to detect divergence and reset. The issue arises when the parameter covariance computed becomes non positive definite (negative eigen values) from differencing covariances with finite arithmetic. In embodiments, a more modern approach may be to use square root derivations where the covariance is expressed ad a Cholesky factor (square root of a positive definite matrix).

A useful square root Kalman filter is described, for example, in U.S. Prov. App. No. 61/042,431, incorporated herein by reference in its entirety. The Kalman filter may be used to track the node Doppler to better estimate the effective frequency difference with the tracked range. These features can provide most of the added information required for geolocation if enough nodes are visible from all other nodes. The computational complexity of the Kalman filter is proportional to the number of observations and the square of the number of parameters tracked. In the case considered there are 2 observation variables and 2 states. The update would then require about 40 MAC ops+4 square roots or divisions (there may be different algorithms for the LQD it depends on if the square root or division is easier. Typically there is little difference however). With 128 nodes on a 200 MOP processor the total time update would require about 32 microseconds, or about 50 OPS per update.

Figure 8:
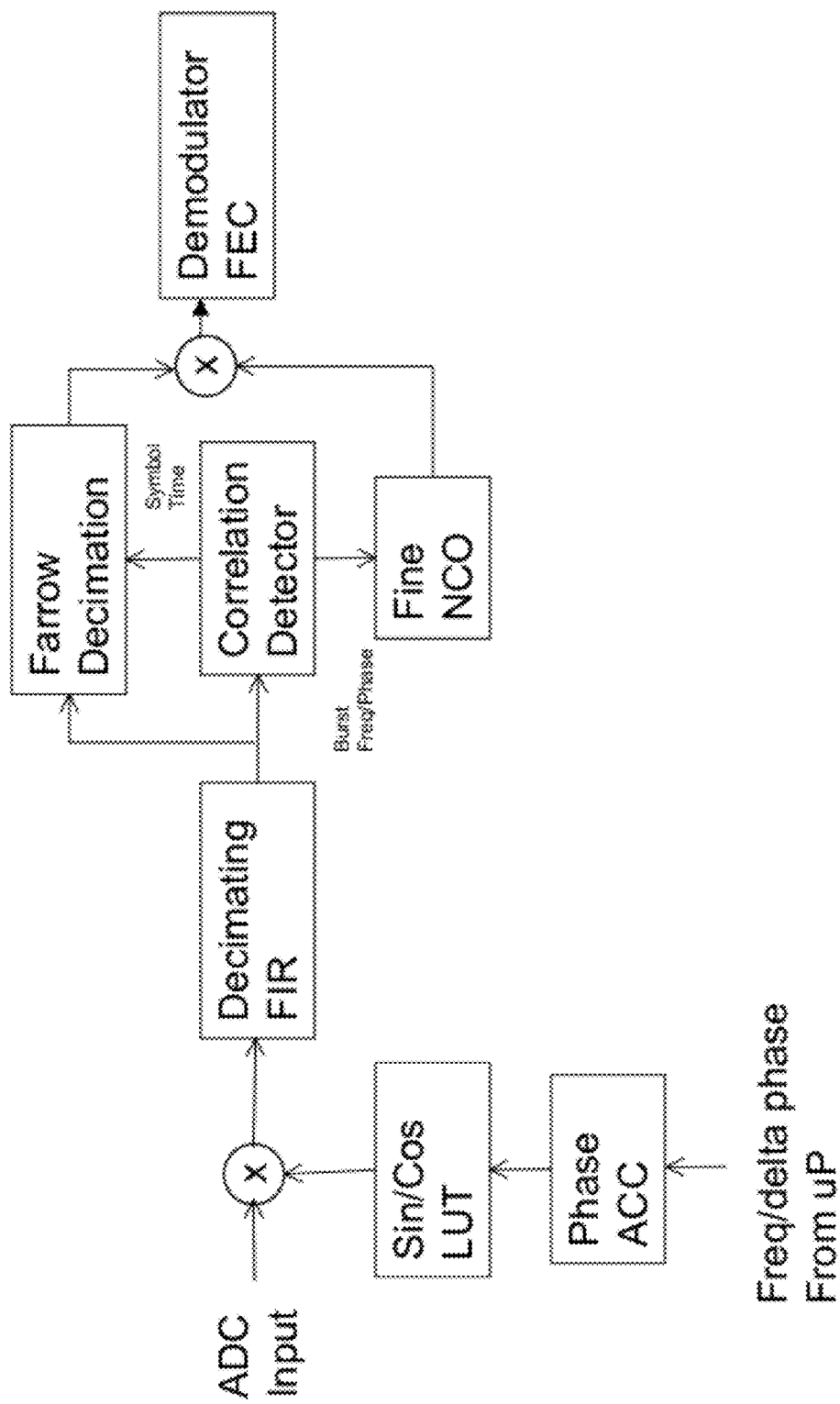
FIG. 8 shows a block diagram of a digital receiver implementing a Kalman filter to recover/maintain synchronization as described herein.

FIG. 8 shows a block diagram of a digital receiver implementing a Kalman filter to recover/maintain synchronization as described herein.

Figure 9:
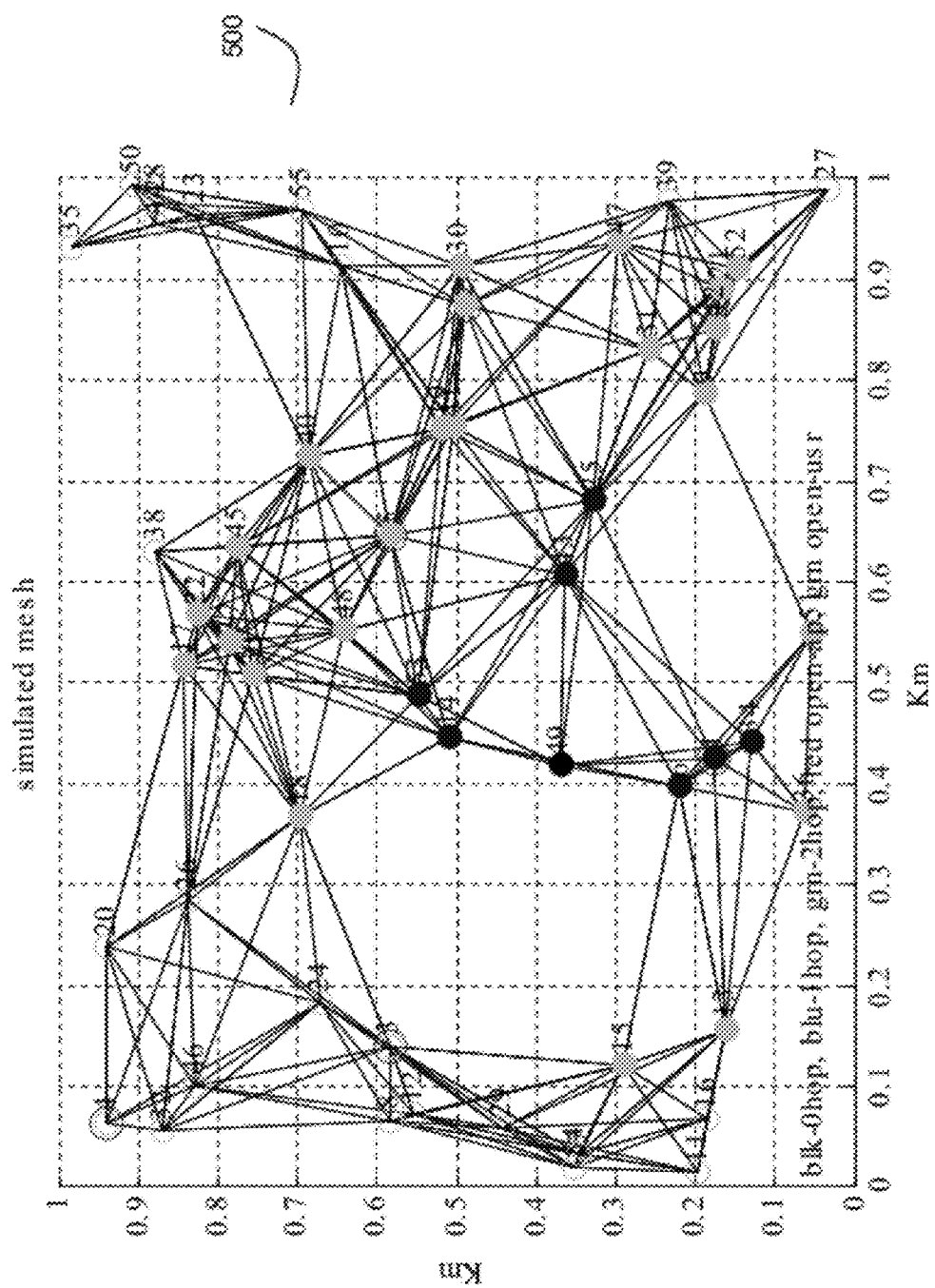
FIG. 9 depicts a simulated mesh of nodes and access points.

FIG. 9 depicts a simulated mesh of nodes and access points. More specifically, FIG. 8 depicts a spatial distribution of a mesh 800 with fifty nodes and five access points distributed over about one kilometer square.

Figure 10:
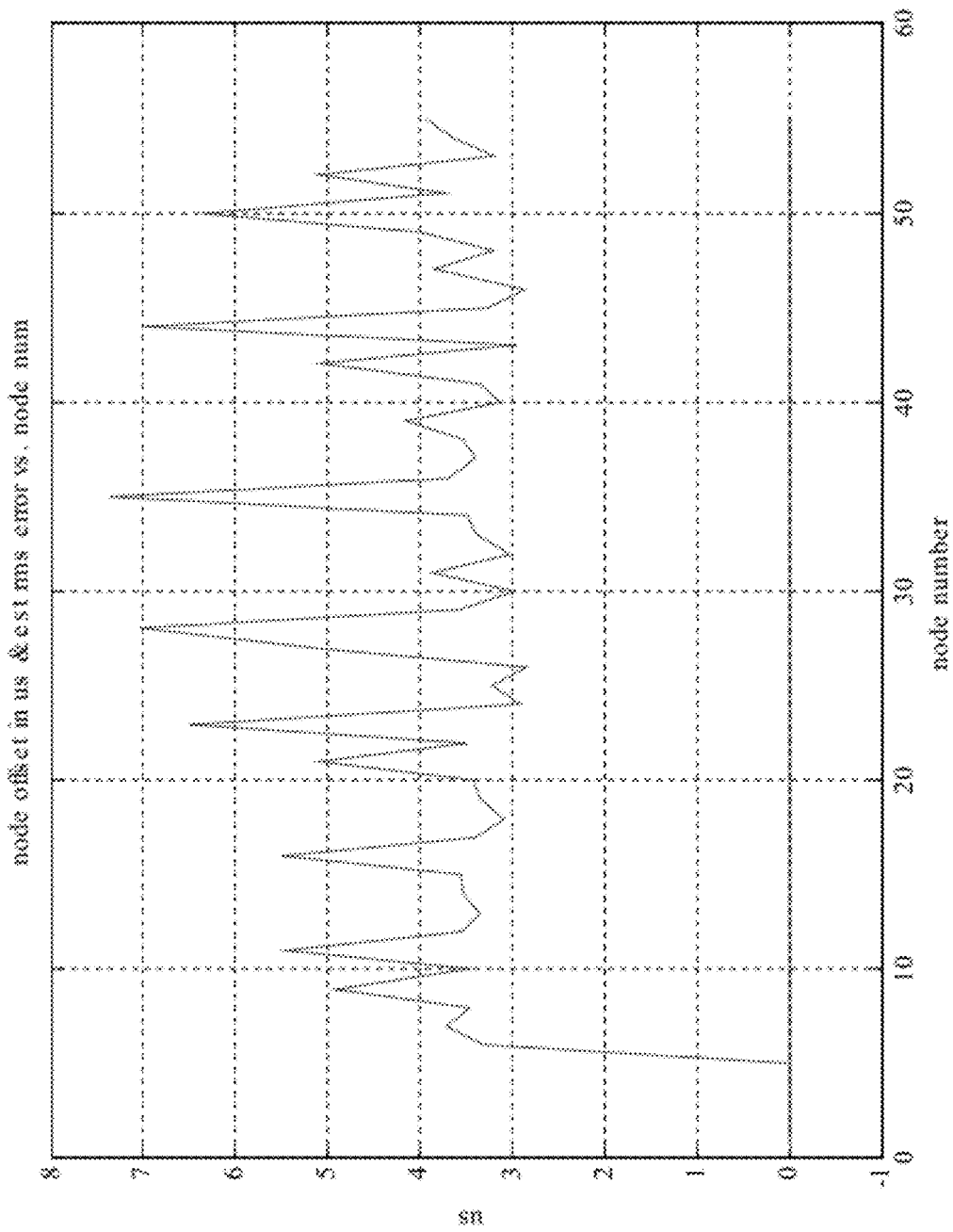
FIG. 10 depicts simulation results for the mesh of FIG. 9.

FIG. 10 depicts simulation results for the simulated mesh of FIG. 9. The simulation time was for 100 slots with each node having a probability of transmission of 10% on each round. The estimated Root Mean Square (RMS) timing error is plotted vs. the node identifier. After just 100 slots intervals it is seen that most nodes have an RMS synchronization error of about four microseconds. This error gradually decreases with the number of slots seen and eventually floors out at about 2 microseconds. The neighbor error however is much less and typically about 0.5 microseconds for the examples simulated.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While ad hoc wireless networking techniques are generally known, a mobile ad hoc network over which the foregoing techniques may be deployed is now described in greater detail for purposes of providing additional context for the inventive methods and systems described herein.

Figure 11:
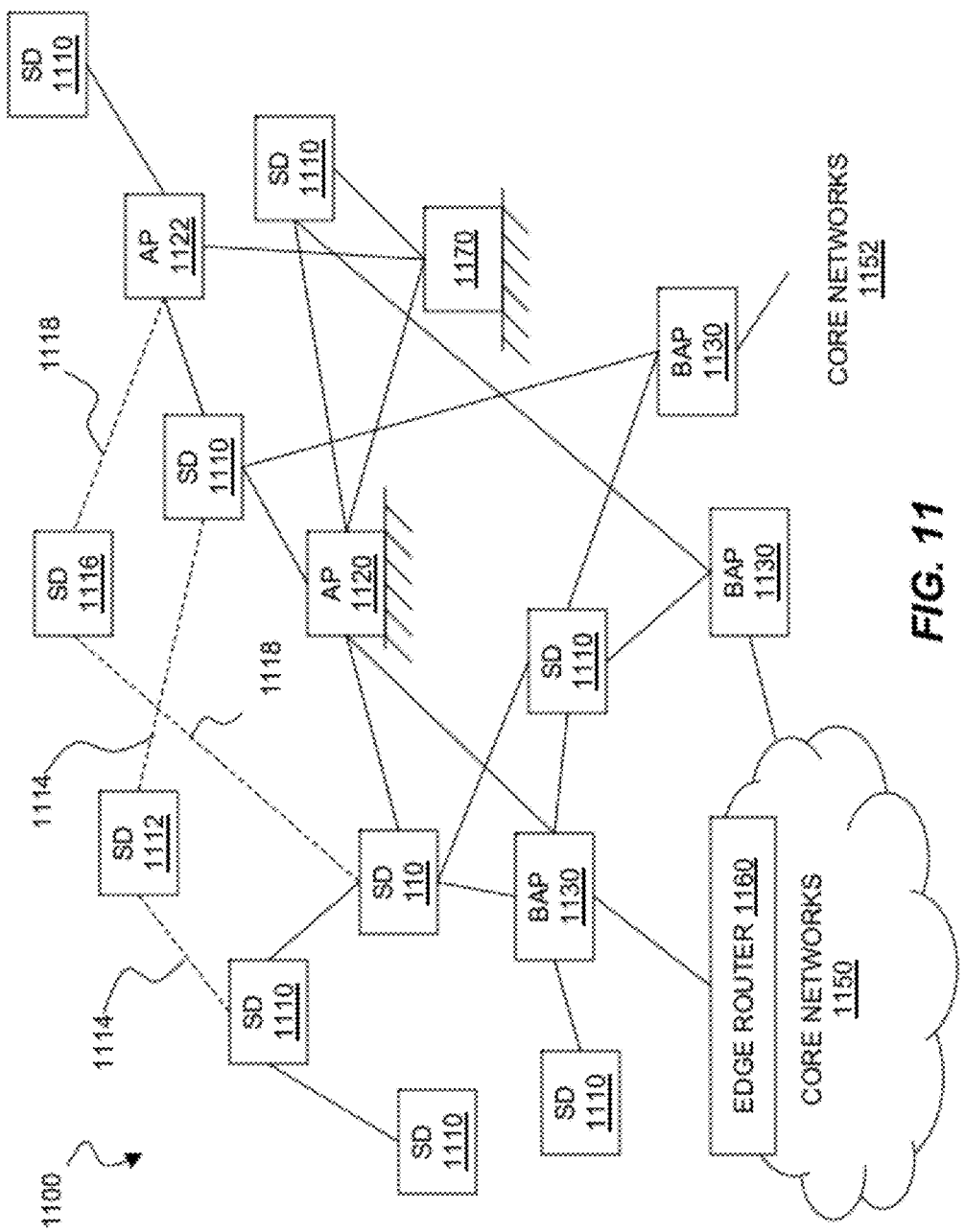
FIG. 11 is a block diagram of a Mobile Ad Hoc Network (MANET).

FIG. 11 shows a Mobile Ad Hoc Network (MANET) that may be used with the systems and methods described herein. In general, a MANET 1100 (also referred to generally herein as a network 1100) may include subscriber devices 1110, access points 1120, and backhaul access points 1130 (for coupling to a core network 1150 such as the Internet), all generally interconnected to one another as shown for example in FIG. 11. Without limiting the generality of the foregoing, one or more of the subscriber devices 1110 may be a stationary device 1170 that does not geographically move within the MANET 1100. It will be understood that the device-to-device links illustrated in FIG. 11 are for purposes of illustration only, and in no way are intended to limit the nature or number of links between devices in the MANET 1100, which may be created, removed, and/or modified over time according to any corresponding protocols followed by the devices within the MANET 1100. In general, the links among devices or components within the MANET 1100 are wireless links, although wired links may optionally be employed in various locations such as between the backhaul access point 1130 and the core networks 1150. In order to maintain the MANET 1100, typically one or more protocols are shared among the participating devices to control creation, removal, and modification of individual data links between devices, and to route traffic and control information among the devices. The term protocol as used herein generally refers to any and all such rules, procedures, and/or algorithms used in maintaining the MANET 1100, unless a specific protocol is explicitly stated or otherwise clear from the context.

Subscriber devices 1110 may include any general purpose nodes participating in the MANET 1100 according to suitable protocols. Subscriber devices 1110 may, for example, include terminal nodes that send or receive data. Subscriber devices 1110 may also or instead suitably be employed as intermediate nodes to route traffic to and from other subscriber devices 1110. Thus an ad hoc network as described herein is generally extensible, and as new subscriber devices 1110 appear within the MANET 1100, they may form a part of the MANET 1100 fabric that routes traffic among other nodes. A new subscriber device 1112 may be introduced to the MANET 1100 with new links 1114 being added as the new subscriber device 1112 is detected. Devices may also periodically leave the MANET 1100 such as a departing subscriber device 1116. As the departing subscriber device 1116 leaves the network, links 1118 between the departing subscriber device 1116 and other subscriber devices 1110, access points 1122, stationary devices 1170, backhaul access points 1130, and/or other devices may be severed. This may occur, for example when a device moves beyond geographical boundaries of the MANET 1100, when devices in the MANET are turned off (or their wireless or networking capabilities are suspended), or when a hardware or software malfunction occurs. The MANET 1100 may, in a centralized or distributed manner, detect new and/or departing devices and/or links in order to maintain substantially continuous connectivity for devices in the MANET 1100.

In general, a subscriber device 1110 may include any network or computing device that includes a wireless interface, one or more network protocol stacks, and the like adapted to participate in the MANET 1100. The Internet Protocol may usefully be employed in subscriber devices 1110 within the MANET 1100 in order to use well-established addressing schemes and the like. A subscriber device 1110 may include without limitation a cellular phone, personal digital assistant, wireless electronic mail client, laptop computer, palmtop computer, desktop computer, video device, digital camera, electrical instrument, sensor, detector, display, media player, navigation device, smart phone, wireless networking card, wireless router (e.g., for a local WiFi network), storage device, printer, or any other device that might usefully participate in a network. In some embodiments subscriber devices may include a GPS receiver providing a position and timing reference. In embodiments, each subscriber device 1110 may be authenticated and/or authorized before being granted access to the MANET 1100.

Access points 1120 may be provided to establish a permanent or otherwise generally stable infrastructure to the MANET 1100. An access point 1120 may be fixed in location or may be limited in the amount that it can move or may be a mobile access point 1122 that can freely move within the MANET 1100. The access points 1120 may employ identical network functionality and protocol stacks as the subscriber devices 1110 described above. The access points 1120 may also or instead encapsulate different functionality consistent with a more specialized role in the MANET 1100. In one aspect, the access points 1120 may have no associated computing device that originates or consumes network traffic. That is, the access points 1120 may simply form a mesh of participants in the MANET 1100 and relay traffic among other network participants. An access point 1120 may also include a physical connection to a power infrastructure so that it may be physically installed at a location and operate autonomously without requiring regular maintenance for battery changes and the like. In another aspect, access points 1120 may include some minimal supplemental circuitry related to, e.g., status and diagnostics, or for receiving software updates and the like. By arranging a spanning network of access points 1120 network continuity may be improved in areas where subscriber devices 1110 are not present or are not expected to be present with any regularity. In embodiments an access point 1120 may be of a size and weight making it suitable for mounting and/or concealment in a variety of locations including indoor and outdoor locations, and including mounting on walls, floors, ground, ceilings, roofs, utility poles, and so forth.

Each access point 1120 may include or utilize a timing reference such as any of the Network Timing Protocols described in the Internet Engineering Task Force's Request for Comments (RFC) 778, RFC 891, RFC 956, RFC 958, RFC 1305, RFC 1361, RFC 1769, RFC 2030, and RFC 4330, all published by The Internet Engineering Task Force. Each access point may also, or instead, include a GPS receiver providing a position and timing reference, or any other open or proprietary timing system may be employed.

In embodiments the access points 1120 may have a greater transmit power and/or a greater antenna gain than mobile subscriber devices 1110, thus providing greater physical coverage than some other devices within the MANET 1100.

The MANET 1100 may include one or more backhaul access points 1130 that generally operate to connect nodes within the MANET 1100 to a core network 1150 such as the Internet. A core network 1150 may be a fixed network or may be an infrastructure network. On one interface, a backhaul access point 1130 may have a wireless radio interface, one or more protocol stacks and other components of other nodes within the MANET 1100. On another interface, the backhaul access point 1130 may provide any suitable interface to the core network 1150. The backhaul access point 1130 may, for example, be deployed at a fiber access point or the like that provides high-speed data capacity for Internet traffic or the like. For example and without limitation, the fiber access point may include a Gig-E router site or an OC-3/12 add-drop multiplexer site. In an embodiment the backhaul access point 1130 may include two Gig-E interfaces for backhaul connections. It will be understood that any number and variety of suitable interfaces for backhaul connections may be usefully employed with a backhaul access point 1130 as described herein.

A backhaul access point 1130 may serve multiple access points 1120 within the MANET 1100, and may distribute network load across those access points. Alternatively, a single backhaul access point 1130 may serve a single access point 1120. The number of access points 1120 served by a backhaul access point 1130 may depend on various factors such as the amount of intra-MANET traffic and extra-MANET traffic, the nature and direction of multicast versus unicast data, and so forth. This association between backhaul access points 1130 and access points 1120 may change from time to time depending on the presence of other subscriber devices 1110 within the area, network conditions, network traffic demands, and so forth. In some cases or under some operating conditions, an access point 1120 may be associated with more than one backhaul access point 1130.

An edge router 1160 may be included between the core network 1150 and one or more backhaul access points 1130. The edge router 1160 may facilitate routing between the MANET 1100 and the core networks 1150. The core networks 1150 may be connected through an edge router 1160 to a backhaul access point 1130 or may be directly connected to a backhaul access point 1130 without going through the edge router 1160. More than one edge router 1160 may be used to contact multiple backhaul access points 1130. In embodiments one edge router may contact multiple backhaul access points 1130. The edge router 1160 may include any devices or systems for maintaining connectivity between the MANET 1100 and the core networks 1150, and may further support or enhance network activity within the MANET 1100. For example, the edge router 1160 may include an industry standard and/or proprietary Address Resolution Protocol server, an application server, a Virtual Private Network server, a Network Address Translation server, a firewall, a Domain Name System server, a Dynamic Host Configuration Protocol server, and/or an Operations, Administration, Maintenance and Provisioning server, and the like, as well as any combination of the foregoing. These various components may be integrated into the edge router 1160 or may be provided as separate (physical and/or logical) systems that support operation of the edge router 1160. These supporting systems may in general support operations such as broadband Internet connectivity within the MANET 1100, broadcast communications crossing between the MANET 1100 and the core networks 1150, and so forth, as well as the use of multiple backhaul access points 1130 to efficiently route inter-MANET (and/or intra-MANET) traffic among subscriber devices 1110.

The core networks 1150 may include any network resources outside the MANET 1100. As shown in FIG. 11, there may be any number of different core networks, which may for example include a second core network 1152 connected to the MANET 1100 through a backhaul access point 1130. The second core network 1152 may be wholly independent from the core network 1150, or may connect to the core network 1150 through a fixed or other type of network. The core networks 1150 may connect disparate, geographically remote and/or local instances of the MANET 1100 to form a single network. The core networks 1150 may include any and all forms of IP networks, including LANs, MANs, WANs, and so on. The core networks 1150 may also or instead include the public Internet, the Public Switched Telephone Network, a cellular communications network, or any other network or combination of networks for data traffic, voice traffic, media broadcasting, and so forth. In other embodiments the core networks 1150 may consist exclusively of a single zone of administrative control, or a number of zones of administrative control, or some combination of an administrative zone and any of the foregoing.

The stationary device 1170 may include any subscriber device 1110 that, for whatever reason, does not physically move within the MANET 1100. In general, such fixed physical points within the MANET 1100 may provide useful routing alternatives for traffic that can be exploited for load balancing, redundancy, and so forth. This may include, for example, a fixed desktop computer within the MANET 1100.

Communication within the MANET 1100 may be accomplished via protocols, referred to collectively herein as the MANET Wireless Protocol (MWP). In general, any of the nodes above that participate in the MANET 1100 according to the MWP may include a hardware platform enabling radio software and firmware upgrades, which may include for example a dedicated or general purpose computing device, memory, digital signal processors, radio-frequency components, an antenna, and any other suitable hardware and/or software suitable for implementing the MWP in participating nodes.

In embodiments, any of the foregoing devices such as one of the access points 1120 may also include an adapter for other networks such as an Ethernet network adapter or equivalent IP network adapter, router, and the like, so that non-MANET equipment can participate in the MANET 1100 through the device. It will also be appreciated that, while connections to core networks 1150, 1152 are shown, these connections are optional. A MANET 1100 (with or without access points 1120) may be maintained independently without connections to any other networks, and may be usefully employed for the sole purpose of trafficking data among subscriber devices 1110.

FIG. 2 shows a MANET Wireless Protocol (MWP) stack that may be used by devices within the MANET 1100 of FIG. 11.

In general, a protocol stack provides a reference model for communications among network devices so that functions necessary or useful for network communications are available while each functional layer can be designed, modified, and/or deployed free from the implementation details of neighboring layers. Methods and systems disclosed herein may employ any suitable protocol stack to support wireless communications among devices. This may include, for example the Open Systems Interconnection (OSI) Reference Model (with seven layers labeled Application, Presentation, Session, Transport, Network, Data Link (LLC & MAC), and Physical) or the TCP/IP model (with four layers labeled Application, Transport, Internet, Link) along with any adaptations or variations thereof suitable for use in a MANET, or any entirely different computer network protocol design. The lower layer(s) of a protocol stack that support physical interfaces, medium access control, routing and the like may be modified to accommodate mobile wireless ad hoc networking while industry-standard protocols are supported at the routing layer (e.g., for routing at a MANET boundary and/or beyond) and above. In this manner, industry standard applications and devices may be employed within the MANET while using the MANET infrastructure to manage communication. Thus, applications designed for the fixed Internet may be deployed in the MANET, and vice versa, without requiring intervention, such as of a carrier or service provider.

In various embodiments, functions within each layer may be augmented, reduced, or modified on a device-by-device basis. For example, the functionality of each of the layers may be pruned to meet specific requirements without deviating from the scope of the invention. The function(s) of a particular layer may be implemented in software and/or hardware without deviating from the scope of the invention.

As shown in FIG. 12, the layers of a MANET Wireless Protocol (MWP) stack may include a routing layer 1202, a medium access control ("MAC") layer 1204, and a physical layer 1206. By way of example and not of limitation, each of these layers and the associated functions are now discussed in greater detail.

The routing layer 1202 may implement industry standards for routing such as Internet Protocol version 4 (IPv4) as described in RFC 791 and Border Gateway Protocol 4 (BGP4) as described in RFC 4271. The routing layer 1202 may also implement wireless ad hoc networking technologies to replace, e.g., Open Shortest Path First (OSPF) as described in RFC 2740 such as scoped link state routing and/or receiver-oriented multicast. This layer may for example support industry-standard unicast and multicast routing protocols at a boundary between a MANET and a fixed network while providing propriety unicast and multicast routing within the MANET.

The Medium Access Control (MAC) layer 1204 may implement industry standards for medium access control and related functions, such as RFC 894 and RFC 1042 for encapsulation, Institute of Electrical and Electronic Engineers (IEEE) 802.3 for Media Access Control (MAC), RFC 826 for Address Resolution Protocol (ARP), and RFC 2131 for Dynamic Host Configuration Protocol (DHCP). The MAC layer 1204 may also implement wireless ad hoc networking technologies to replace, e.g., IEEE 802.2 LLC and IEEE 802.1q such as neighbor discovery management, adaptive data rates, and proprietary queue serving. Similarly, RFC 1661 and 2516 for Point-to-Point Protocol (PPP) may be substituted with proprietary link scheduling and/or node activated multiple access (NAMA) channel access. The MAC layer 1204 may, for example, support quality of service differentiation using channel access and/or queue servicing to prioritize delay-sensitive traffic. In this layer, neighbor management may establish network entry for devices and track changes in each node's local one-hop and two-hop neighborhoods, such as through a message exchange with one-hop neighbors. The MAC layer 1204 may support adaptive power control by adjusting transmit power on a link-by-link basis in a MANET in a manner that, e.g., maximizes transmission capacity while minimizing interference according to link conditions and topology. Adaptive data rates may be employed on a link-by-link basis to maximize transmission capacity according to individual link conditions. Queue servicing may provide buffers for data awaiting transmission through a physical layer 1206 interface, and may incorporate differentiated quality of service. At the same time, channel access may be used to determine which node transmits in each Time Division Multiple Access (TDMA) time slot, with a schedule influenced by quality-of-service parameters.

The physical layer 1206 may implement wireless technologies such as segmentation and reassembly of physical layer transmissions, local area node tracking algorithm (LANTA) network timing, and slot-by-slot configurable waveforms, as well as multiple waveform modes including time domain multiple access and frequency domain multiple access waveforms, or more generally any waveforms that support multiplexing or multiple access based on time, frequency, coding, or the like. In general network timing is also provided within the physical layer 1206, and may correct time and frequency errors to ensure that all nodes are operating with a common time base. At the same time, waveform mode self-discovery may be employed so that each receiver can autonomously discover which waveform mode was sent from a transmitter.

These and other functions and details of operation of a MANET Wireless Protocol stack are described in greater detail for example in U.S. application Ser. No. 12/418,363 filed on Apr. 3, 2009, the entire contents of which are incorporated herein by reference.

Figure 13:
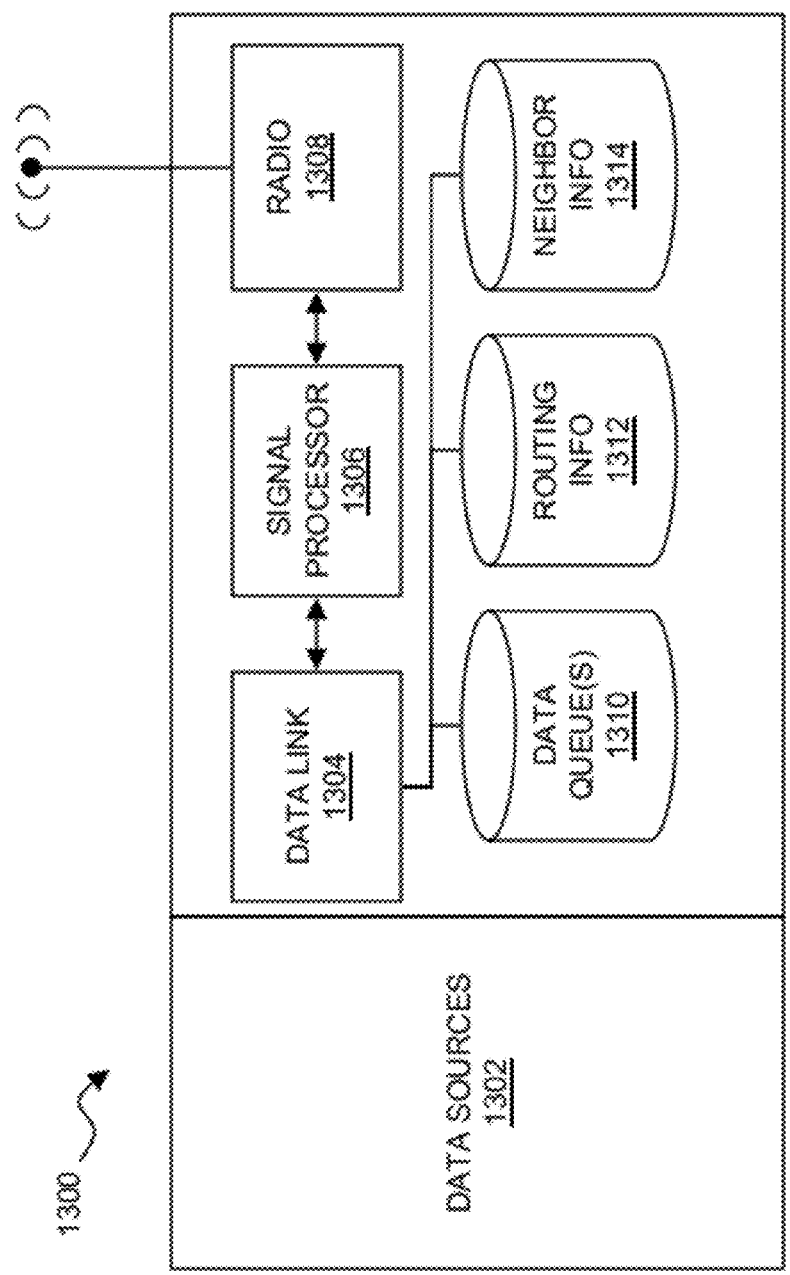
FIG. 13 is a block diagram of a node in a wireless ad hoc network.

FIG. 13 is a block diagram of a node in a wireless ad hoc network such as the MANET described above. The node may be any of the devices described above, such as a subscriber device, access point, or backhaul access point. In general the node 1300 may include data sources 1302, a data link 1304, a signal processor 1306, a radio 1308, data queues 1310, routing information 1312, and neighborhood information 1314. It will be understood that the following description is general in nature, and that numerous arrangements of processing, storage, and radio frequency hardware may be suitably employed to similar affect. This description is intended to outline certain operations of a MANET node relevant to the systems and methods described herein, and in no way limits the invention to the specific architecture shown in FIG. 13.

The data sources 1302 may include any applications or other hardware and/or software associated with the node 1300. This may include, for example, programs running on a laptop or other portable computing device, a web server or client, a multimedia input and/or output sources such as a digital camera or video, and so forth. More generally any device, sensor, detector, or the like that might send or receive data may operate as a data source 1302 in the node 1300. It will be further understood that some nodes such as access points 1104 may not have independent data sources 1302, and may function exclusively as MANET 1100 network elements that relay data among other nodes and/or provide network stability as generally described above.

The data link 1304 may include hardware and/or software implementing data link layer functionality such as neighbor management, segmentation and reassembly of data packets, Quality of Service (QoS) management, data queue servicing, channel access, adaptive data rates, and any other suitable data link functions. In general, the data link 1304 controls participation of the data sources 1302, and more generally the node 1300, in a MANET. It will be understood that the data link 1304 in FIG. 13 may implement any number of lower layer (e.g., physical layer) or higher layer (e.g., routing, transport, session, presentation, application) protocols from a conventional Open Systems Interconnection (OSI) Model, or any such protocols and related functions may be implemented elsewhere within the node 1300, such as in an IP stack executing on the data source 1302, or in firmware within the signal processor 1306 or radio 1308, or in additional functional blocks not depicted in FIG. 13. For example, routing protocols may be implemented within hardware/software of the data link 1304 in order to ensure that nodes in the MANET 1100 share appropriate routing functions. Thus it will be appreciated that while the certain elements discussed herein might suitably be placed within the data link layer of a formal protocol stack, the systems and methods of this disclosure might also or instead be implemented with variations to a conventional protocol stack, or without any formal protocol stack whatsoever.

The data link 1304 may include a link manager that collects neighbor information from the data link layer, and may form and maintain the neighborhood information 1314 for the node 1300. This table may be used to establish routes to neighbors, and may be updated periodically with information from one and two hop neighbors as described further below. The link manager may monitor statistics on all active links for a node on a link-by-link basis in order to support link quality calculations and other functions described herein. The term metadata is used herein to generally refer to the neighborhood information 1314 for the node 1300 or any other information characterized one or more nodes, data links, or other network characteristics that might be shared among nodes to describe the network in which nodes are participating and communicating. In general, the metadata includes at least one item of metadata, although any number of metadata items might be usefully employed according to the number of nodes in a neighborhood and the amount of information to be exchanged among nodes.

The signal processor 1306 may include any signal processing circuitry for waveform processing and timing functions associated with transceiving data at the node 1300. This may include, for example, network timing, time-slot and/or frame-based waveform configuration, maintenance of one or more families of Orthogonal Frequency Division Multiplexing waveform modes (or other transmit mode waveforms), receiver detection of waveform modes, error correction coding, and so forth. In general, the signal processor 1306 may be implemented in any suitable combination of digital signal processors, field programmable gate arrays, application-specific integrated circuits, microprocessors, or other general or special-purpose computing devices, as well as any other combination of digital and/or analog electronics useful for the various signal processing functions described herein.

In one embodiment, a family of Orthogonal Frequency Division Multiplexing (OFDM) waveforms may be employed for adaptive data rate communications. The modes of the OFDM waveforms may, for example, include 7.2 MHz Quadrature Phase-Shift Keying (QPSK), 4.8 MHz QPSK, 2.4 MHz QPSK, 1.2 MHz QPSK, 1.2 MHz Binary Phase-Shift Keying (BPSK), or the like. The effective data rate for transmit waveforms may be affected by other parameters such as error correction. In order to facilitate implementation of an adaptive rate system, the transmit modes may be organized into an ordered list of monotonically increasing data rates matched to correspondingly decreasing signal robustness, thus permitting unique mapping of link quality to transmit mode. In one aspect, the actual waveform mode selected to transmit data on a link may be adaptively selected according to any suitable evaluation of link quality for links to neighboring nodes.

The radio 1308 in general operates to transmit data from the data queue(s) 1310, as organized and encoded by the data link 1304 and the signal processor 1306 (along with any control information, packet header information, and so forth), over a wireless air interface to other nodes in a MANET, and to perform complementary data reception. The radio 1308 may include any radio frequency analog circuitry and the like, and may be coupled to the signal processor 1306 which converts data and control information between a digital representation used within the node 1300, and an analog representation used in radio frequency communications with other nodes. In embodiments, a low power radio 1308 may be employed, such as where the node 1300 is a battery-powered mobile device. In other embodiments, a high-power radio 1308 may be employed, such as where the node 1300 is an access point or backhaul access point connected to a fixed power infrastructure. In an embodiment, the radio 1308 and signal processor 1306 provide adaptive data rate coding capable of changing transmit modes, error correction, and the like according to measured link quality.

The data queue(s) 1310 may include any data for transmission from the node 1300. This may include, for example, data from the data sources 1302, data that is relayed by the node 1300 from other nodes in the MANET, and/or control information scheduled for transmission within data packets from the node 1300. The data queue(s) 1310 may be organized in any suitable fashion, and may include a single first-in-first-out queue, multiple queues, prioritized queues, and the like. In one embodiment, the node 1300 may include multiple prioritized queues to assist in providing various service levels, such as for QoS traffic. In general, data in the data queue(s) 1310 is delivered according to any suitable queuing mechanism to the data link 1304, signal processor 1306, and radio 1308 for transmission within the MANET.

Routing information 1312 such as a routing or forwarding table may be provided to support routing functions by the node 1300. In general, this may include, for example, a destination address or identifier, a cost of a path to the destination (using any suitably cost calculation), and a next hop on that path. Other information such as quality of service and other metrics for various routes and links may also be provided for more refined routing decisions.

Neighborhood information 1314 may be maintained in a database, flat file, routing table, or other suitably organized volatile or non-volatile storage within the node 1300. The neighborhood information 1314 generally supports the creation and maintenance of the MANET as well as routing functions of each MANET node. Within the MANET, each node may interact with other nodes to autonomously identify and maintain local network connections, shift capacity, dynamically form routes throughout the network, and so on. The routing functions of the node (as supported by the neighborhood information 1314) may accommodate delay-sensitive (e.g. voice) traffic, delay-tolerant traffic with quality of service (QoS) prioritization, and so on.

The neighborhood information 1314 may include an identification of neighboring nodes along with information relating to those nodes. This may include one-hop neighbors (i.e., neighboring nodes in direct wireless communication with the node 1300), two-hop neighbors (i.e., neighboring nodes that communicate with the node 1300 through only one other node), or any other nodes or participants within the MANET. In one aspect, neighborhood information 1314 includes link quality information for the radio 1308, which may be obtained from any combination of physical layer and data link data, and may be employed to adapt the data rate of communications according to currently present channel conditions. The neighborhood information may also include QoS data used to select next hops for QoS data. Other useful information may include bandwidth utilization, node weights, node position (either logical or physical), and queue latency for each QoS type and/or other priority type.

In one aspect, the neighborhood information 1314 may be gathered during periodic exchanges (such as during control transmissions) with neighboring nodes, which may occur under control of the link manager of the data link 1304. For example, the node 1300 may determine output bandwidth (i.e., data transmit requirements) for each link that the node 1300 has with a neighbor, and may transmit this to one-hop neighbors. Similarly, the node 1300 may receive output bandwidth from each one-hop neighbor. Using this data, each node 1300 may further calculate its own input bandwidth (i.e., data receive requirements) from each link to a neighboring node, and this information may in turn be exchanged with one-hop neighbors. Following a system-wide exchange with one-hop neighbors, the node 1300 (and every other node in the MANET) may calculate a node weight that represents relative output requirements for the node 1300. For example, the node weight, W, may be calculated as:

$$W = \frac{BW_{out}}{BW_{out} + BW_{in}} \quad \text{[Eq. 2]}$$

where $BW_{out}$ is the total output or transmit requirements for each link of the node 1300, and $BW_{in}$ is the total input or receive requirements for each link of the node 1300. Finally, the node 1300 may transmit the node weight to each neighboring node, and may in turn receive a node weight from each neighboring node. It will be appreciated that the node weight, W, may be further processed for use with other neighborhood information 1314, such as by limiting the value according to the number of bits used for control information, or by providing a supplemental adjustment to the node weight to further refine control of routing or other MANET functions. Sharing of information for maintenance of the neighborhood information 1314 may be controlled, for example, by the data link 1304, which may apply any suitable technique to determine when to share information with one hop neighbors. In one aspect, the data link 1304 may transmit data whenever a change is detected in the MANET such as an addition or deletion of a node.

As noted above, any of the neighborhood information 1314, routing information 1312, and/or data queue(s) 1310, as well as status or other information concerning any of the foregoing, may usefully be shared among the nodes participating in a network, and all such information is intended to fall within the meaning of metadata as that term is used herein.

In another aspect, for a MANET that has location-aware nodes 1300 (e.g., using Global Positioning System (GPS) data, signal strength data, and so forth), the neighborhood information 1314 may include position and timing data in order to support synchronization as contemplated herein.

Figure 14:
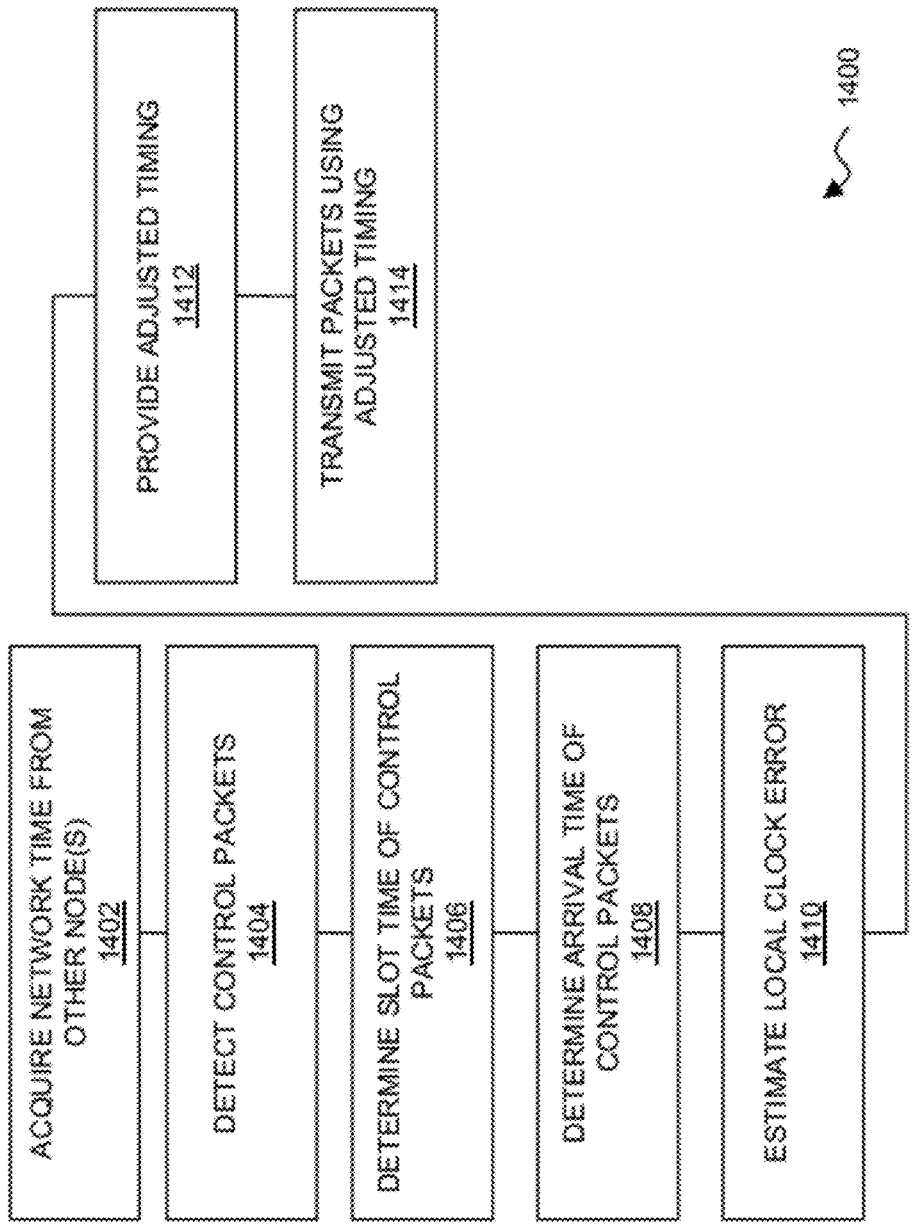
FIG. 14 is a flow chart of a method for synchronizing a node in an ad hoc network.

FIG. 14 is a flow chart of a method for synchronizing a node in an ad hoc network. More specifically, there is depicted a method for synchronizing a node in an ad-hoc network that includes a plurality of other node. In general, the ad hoc network may use an air interface with time-division multiple access where each packet is transmitted within a specific time slot, typically a time slot that is scheduled in advance among participating nodes.

As shown in step 1402, the method 1400 may include acquiring a network time from one of the plurality of other nodes. This may, for example include obtaining time slot or other network time data from a control packet or other packet communicated in the network, e.g., during an off-network state as described above. The network time may be explicit, or implicit, and may be provided for example within medium access control ("MAC") header data for a control packet. In another aspect, the time may be global positioning system ("GPS") time acquired, e.g., from GPS hardware of a node that sent the control packet.

As shown in step 1404, the method 1400 may include detecting a number of control packets in the ad hoc network. The plurality of control packets may each be transmitted from one of the other nodes within a time slot of a time-division multiple access air interface used in the network.

As shown in step 1406, the method 1400 may include determining a slot time in the network time for each of the control packets based upon corresponding header data for each of the control packets. The slot time may be explicitly identified within header data, or may be implicit or otherwise labeled for recovery by the receiving node. It will be appreciated that frequency may also be a useful parameter for estimating and correcting local timing errors. More generally, it will be understood that frequency drift or offset resulting from, e.g., Doppler effects, oscillator drifts, multipath signals, carrier harmonic detection, and so forth, may contribute to timing errors. As such, a correction system as contemplated herein may usefully compare the center frequency at which a packet is detected to the carrier frequency on which the packet was transmitted, as determined by inspection of packet header data. Thus in one aspect, the method 1400 may include determining a carrier frequency on which a packet was transmitted and/or measuring the center frequency for received control packets, and determining an offset for use in correcting a local clock.

As shown in step 1408, the method 1400 may include determining a time of arrival for each of the control packets relative to a local clock of the node. In general, the node will have a local time maintained by a local clock using, e.g., a voltage controlled, numerically controlled, or other internal oscillator, such as the oscillators shown and described above.

As shown in step 1410, the method 1400 may include estimating an error in the local clock relative to the network time based upon the slot time and the time of arrival, thereby providing an offset. The error may be estimated using, e.g., any of the Kalman filter techniques described above that relate various input states (such as slot time, arrival time, carrier frequency, and so forth) to an offset that can be used locally to adjust the local clock to the observed network timing. Thus for example, estimating the error may include applying a Kalman filter to one or more slot times and one or more times of arrival for the control packets. It will be understood that, while Kalman filtering is one suitable and computationally efficient technique for providing offsets based upon mean errors in observed data, numerous other mathematical and analytical techniques may also be employed, and any such technique suitable for implementation in a node of a wireless ad hoc network may be used to determine an offset without departing from the scope of this disclosure.

As shown in step 1412, the method 1400 may include adjusting the local clock according to the offset in order to synchronize the local clock to the network time, thereby providing an adjusted timing. It will readily be appreciated that this may include directly controlling or adjusting the local clock, or applying an offset when slotting outbound communications without any change to the underlying local clock. Any suitable technique for providing an adjusted timing as contemplated herein may be usefully employed without departing from the scope of this disclosure. The adjusted timing may also or instead include other observable sources of error that might cause variations between network time and local time including without limitation link delays, path delays, frequency drift, and so forth. As generally discussed above, the timing errors may be estimated, and the corresponding adjustments to a local clock may be made, based upon a mean error between the center frequency at which control packets are received and the carrier frequency on which they are transmitted.

As shown in step 1414, the method may include transmitting a packet from the node in the time-division multiple access air interface using the adjusted timing.

It will be appreciated that the techniques described herein may be adapted to other timing-related functions of an ad hoc network node. For example, the covariance of the offset may provide a good indicator of proper oscillation function within a node, so that operation of the oscillator can be monitored, and faults detected, based upon the covariance of the offset.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices or any other processing circuitry that may be configured to process electronic signals as contemplated herein. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code such as code stored in a non-transitory computer readable medium that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A device comprising:
a radio that provides an air interface for communication with a plurality of other nodes in an ad hoc network, the air interface including a time-division multiple access interface having a plurality of time slots;
a local clock; and
a processor that controls operation of the radio to transceive data using the air interface, the processor configured to acquire a network time from one of the plurality of other nodes; to detect a number of control packets in the ad hoc network, the plurality of control packets each transmitted from one of the other nodes within one of the plurality of time slots; to determine a slot time in the network time for each of the control packets based upon corresponding header data for each of the control packets; to determine a time of arrival for each of the control packets relative to the local clock; to estimate an error in the local clock relative to the network time based upon the slot time and the time of arrival, thereby providing an offset; to adjust the local clock according to the offset in order to synchronize the local clock to the network time, thereby providing an adjusted timing; and transmit a packet in the time-division multiple access air interface using the adjusted timing.

2. A computer program product embodied in a non-transitory computer-readable medium that, when executing on a node in an ad hoc wireless network that includes a plurality of other nodes, performs the steps of:
acquiring a network time from one of the plurality of other nodes;
detecting a number of control packets in the ad hoc network, the plurality of control packets each transmitted from one of the other nodes within a time slot of a time-division multiple access air interface;
determining a slot time in the network time for each of the control packets based upon corresponding header data for each of the control packets;
determining a time of arrival for each of the control packets relative to a local clock of the node;
estimating an error in the local clock relative to the network time based upon the slot time and the time of arrival, thereby providing an offset;
adjusting the local clock according to the offset in order to synchronize the local clock to the network time, thereby providing an adjusted timing; and
transmitting a packet from the node in the time-division multiple access air interface using the adjusted timing.

3. The computer program product of claim 2 wherein the adjusted timing further includes an adjustment for a path delay.

4. The computer program product of claim 2 wherein estimating an error in the local clock includes applying a Kalman filter to one or more slot times and one or more times of arrival for the control packets.

5. The computer program product of claim 2 further comprising code that performs the step of determining a carrier frequency for the number of control packets based upon the corresponding header data for each of the control packets.

6. The computer program product of claim 5 further comprising code that performs the step of measuring a center frequency for the number of control packets.

7. The computer program product of claim 6 wherein adjusting the local clock includes adjusting the locking clock according to a mean error between the center frequency and the carrier frequency.

8. The computer program product of claim 2 wherein the corresponding header data includes data from a MAC header for each one of the control packets.

9. The computer program product of claim 8 wherein the MAC header includes MAC timing information.

10. A method for synchronizing a node in an ad-hoc network that includes a plurality of other nodes, the method comprising:

acquiring a network time from one of the plurality of other nodes;

detecting a number of control packets in the ad hoc network, the plurality of control packets each transmitted from one of the other nodes within a time slot of a time-division multiple access air interface;

determining a slot time in the network time for each of the control packets based upon corresponding header data for each of the control packets;

determining a time of arrival for each of the control packets relative to a local clock of the node;

estimating an error in the local clock relative to the network time based upon the slot time and the time of arrival, thereby providing an offset;

adjusting the local clock according to the offset in order to synchronize the local clock to the network time, thereby providing an adjusted timing; and transmitting a packet from the node in the time-division multiple access air interface using the adjusted timing.

11. The method of claim 10 wherein the adjusted timing further includes an adjustment for a path delay.

12. The method of claim 10 wherein estimating an error in the local clock includes applying a Kalman filter to one or more slot times and one or more times of arrival for the control packets.

13. The method of claim 10 wherein estimating the error further comprising estimating one or more link delays.

14. The method of claim 10 further comprising monitoring operation of an oscillator of the node based upon a covariance of the offset.

15. The method of claim 10 further comprising determining a carrier frequency for the number of control packets based upon the corresponding header data for each of the control packets.

16. The method of claim 15 further comprising measuring a center frequency for the number of control packets.

17. The method of claim 16 wherein adjusting the local clock includes adjusting the local clock according to a mean error between the center frequency and the carrier frequency.

18. The method of claim 10 wherein the corresponding header data includes data from a MAC header for each one of the control packets.

19. The method of claim 18 wherein the MAC header includes MAC timing information.

20. The method of claim 18 wherein the MAC header includes GPS timing information.

* * * * *